(12) United States Patent
Anders et al.

(10) Patent No.: US 10,373,076 B2
(45) Date of Patent: Aug. 6, 2019

(54) DYNAMIC FILTERING OF POSTED CONTENT

(71) Applicant: INTERNATIONAL BUSINESS MACHINES CORPORATION, Armonk, NY (US)

(72) Inventors: Kelley L. Anders, East New Market, MD (US); Stacy M. Cannon, Apex, NC (US); Trudy L. Hewitt, Cary, NC (US); Meenakshi Nagarajan, San Jose, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 189 days.

(21) Appl. No.: 15/247,209

(22) Filed: Aug. 25, 2016

(65) Prior Publication Data

US 2018/0063198 A1    Mar. 1, 2018

(51) Int. Cl.
*H04L 29/06*        (2006.01)
*G06N 20/00*        (2019.01)

(52) U.S. Cl.
CPC .......... *G06N 20/00* (2019.01); *H04L 63/102* (2013.01)

(58) Field of Classification Search
CPC .... H04L 63/205; H04L 63/102; G06N 99/005
USPC .......................................................... 726/1
See application file for complete search history.

(56) References Cited

U.S. PATENT DOCUMENTS

| 8,494,507 B1 | 7/2013 | Tedesco et al. |
| 9,124,908 B2 | 9/2015 | Roberts et al. |
| 10,140,591 B2 * | 11/2018 | Panigrahi ............. G06F 16/435 |
| 2007/0168354 A1 | 7/2007 | Ramer et al. |

(Continued)

FOREIGN PATENT DOCUMENTS

| JP | 2012114525 | 6/2012 |
| WO | 2013027304 | 2/2013 |

OTHER PUBLICATIONS

List of IBM Patents or Patent Applications Treated as Related, dated May 7, 2019, 1 page.

(Continued)

*Primary Examiner* — Harunur Rashid
*Assistant Examiner* — Sakinah White Taylor
(74) *Attorney, Agent, or Firm* — Alexander Jochym; Andrew D. Wright; Roberts Mlotkowski Safran Cole & Calderon, P.C.

(57) ABSTRACT

Systems and methods for dynamic filtering of content posted to a social network are disclosed. In aspects, a method of the system includes generating, by a computing device, a user profile list for a user of a social network, the user profile list including data regarding the user's preferences with respect to undesirable content; monitoring, by the computing device, a content post on the social network to determine if the content post includes the undesirable content, the content post being displayed to the user through a social network interface; determining, by the computing device, that the content post includes the undesirable content; and effecting a change in the display of the content post in accordance with one or more predetermined display rules based on the determining that the content post includes the undesirable content.

17 Claims, 4 Drawing Sheets

(56) References Cited

U.S. PATENT DOCUMENTS

| | | | |
|---|---|---|---|
| 2010/0121707 A1* | 5/2010 | Goeldi | G06Q 10/00 |
| | | | 705/14.49 |
| 2013/0311388 A1* | 6/2011 | Myslinski | |
| 2013/0018823 A1* | 1/2013 | Masood | G06F 21/552 |
| | | | 706/12 |
| 2013/0124192 A1 | 5/2013 | Lindmark et al. | |
| 2014/0172989 A1 | 6/2014 | Rubinstein et al. | |
| 2015/0150023 A1* | 5/2015 | Johnson | G06F 9/5027 |
| | | | 718/107 |
| 2016/0078471 A1* | 3/2016 | Hamedi | G06F 16/24578 |
| | | | 705/14.41 |
| 2017/0061392 A1* | 3/2017 | Meza-Guinea | G06Q 10/1095 |
| 2017/0206612 A1* | 7/2017 | Benavides | G06Q 50/01 |

OTHER PUBLICATIONS

Specification "Dynamic Filtering of Posted Content" and Drawings in U.S. Appl. No. 16/398,647, filed Apr. 30, 2019, 34 pages.

* cited by examiner

US 10,373,076 B2

DYNAMIC FILTERING OF POSTED CONTENT

BACKGROUND

The present invention relates generally to content filtering and, more particularly, to systems and methods for dynamic filtering of content posted to a social network.

Many people find it difficult to effectively monitor all comments associated with posts in their social network feeds (e.g., social media network feeds) to determine if they want to engage in commenting or interacting with the posts. Social network participants may want to engage in social computing while neither inciting nor condoning "trolling" or other bad behaviors. Many celebrities, political figures and other high profile social network participants who post photographs may receive both nice and mean spirited comments on the post, and there is currently no effective method for limiting or filtering out those mean spirited comments. In some applications, a user can right click on a post to physically select an option to hide a post and/or similar posts, or "un-follow" the originator of a post. However, such applications do not enable a user to dynamically learn a user's content preferences, nor does it allow users to dynamically filter out comments from within a post without hiding the entire post.

SUMMARY

In an aspect of the invention, a computer-implemented method includes: generating, by a computing device, a user profile list for a user of a social network, the user profile list including data regarding the user's preferences with respect to undesirable content; monitoring, by the computing device, a content post on the social network to determine if the content post includes the undesirable content, the content post being displayed to the user through a social network interface; determining, by the computing device, that the content post includes the undesirable content; and effecting, by the computing device, a change in the display of the content post in accordance with one or more predetermined display rules based on the determining that the content post includes the undesirable content.

In another aspect of the invention, there is a computer program product for dynamic filtering of content posted to a social network. The computer program product comprises a computer readable storage medium having program instructions embodied therewith. The program instructions are executable by a computing device to cause the computing device to: generate a first user profile list for a first user account of the social network, the first user profile list including a first listing of undesirable content; generate a second user profile list for a second user account of the social network, the second user profile list including a second listing of undesirable content; monitor one or more comments associated with a content post on the first social network account to determine if the one or more comments include undesirable content from the first user profile list, wherein the content post is displayed to the first user through the first user account and is displayed to the second user through the second user account; determine that one of the one of more comments includes undesirable content from the first user profile list and is a suspect comment; and prevent the suspect comment from displaying on the second user account.

In another aspect of the invention, there is a system for dynamic filtering of content posted to a social network. The system includes a CPU, a computer readable memory and a computer readable storage medium associated with a computing device; program instructions to generate, by a learning engine, a user profile list for a user of a social network, the user profile list including data regarding the user's preferences with respect to undesirable content; program instructions to monitor, by the learning engine, a content post on the social network to determine if the content post includes the undesirable content, the content post being displayed to the user through a social network interface; program instructions to determine, by the learning engine, that the content post includes the undesirable content; program instructions to effect a change in the display of the content post, by a filter and alert engine, in accordance with one or more predetermined display rules; program instructions to monitor, by the learning engine, the content post for interactions of the user with the content post; and program instructions to update, by the learning engine, the user profile list based on the monitoring.

BRIEF DESCRIPTION OF THE DRAWINGS

The present invention is described in the detailed description which follows, in reference to the noted plurality of drawings by way of non-limiting examples of exemplary embodiments of the present invention.

DETAILED DESCRIPTION

Figure 1:
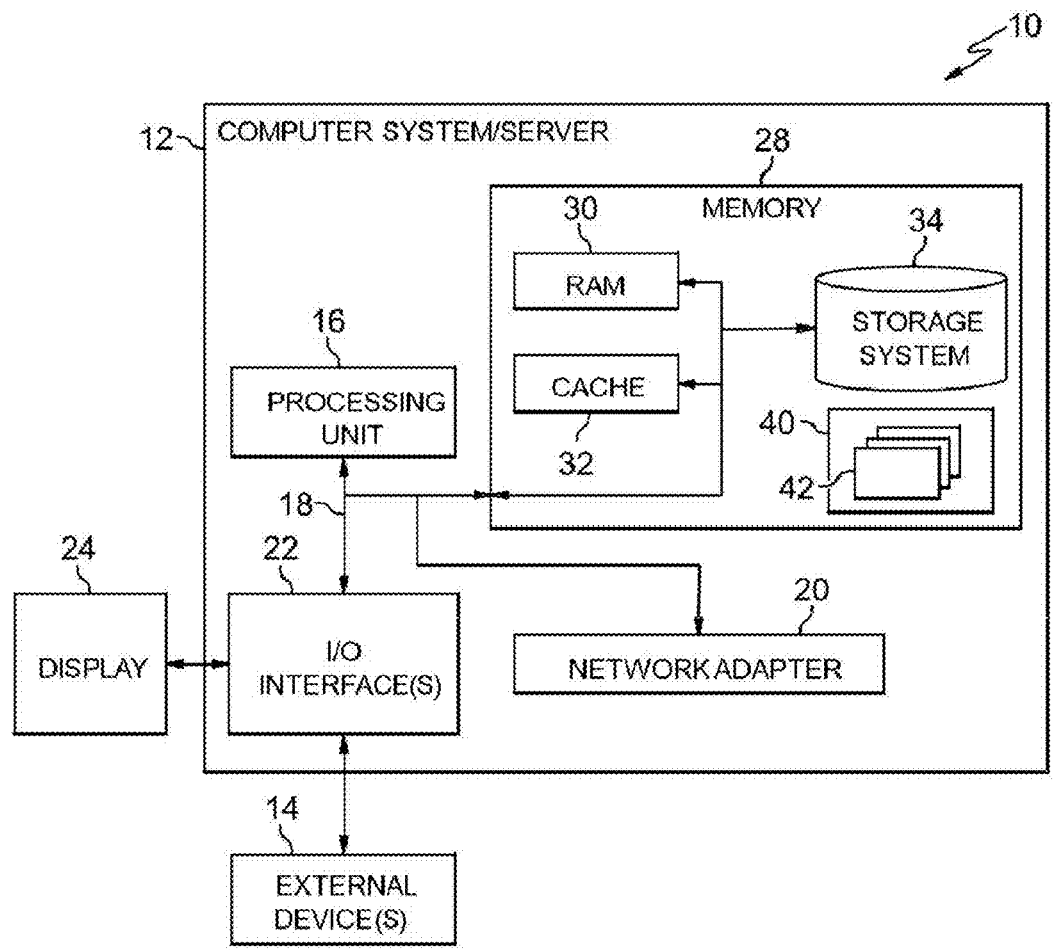
FIG. 1 depicts a computing infrastructure according to an embodiment of the present invention.

The present invention relates generally to systems and methods for dynamic filtering of content posted to a social network. In embodiments, a system and method is provided to dynamically filter online comments associated with an original social network post (e.g., content post), and predict posts that a user would have commented on had it not been for rude or otherwise undesirable comments associated with the original post. Accordingly, the system can help guide a user regarding how to respond to a post. In embodiments, a system dynamically learns a user's preferences based on monitoring their behavior with respect to a social networking site or other interactive online community. The system can alert the user before they comment on a post that has rude or otherwise inappropriate comments, and/or only show comments for mutual network contacts.

In embodiments, a system and method enables the creation of dynamic user and/or group profiles based on data mining to determine what type of post-associated content (e.g., comments, words, phrases, emojis, etc.) the user/group would like and want to be associated with, as well as any post-associated content the user/group would not want to see or be associated with. These profiles enable a customized list (profile list) of undesirable post-associated content (hereafter referred to as undesirable content) that the user/group would not want to see or be associated with, such as rude or angry comments. In aspects, the profiles also enable a customized profile list of desirable post-associated content (hereafter desirable content) that the user/group would desire to see or be associated with. In embodiments, the system passively looks for undesirable content and dynamically hides or otherwise filters the undesirable content. In embodiments, the undesirable content is hidden from the user's view, as well as the view of another user, where the other user is not part of the network of the post-originator, or is has not "liked" or otherwise associated themselves with the post and/or post-originator.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Referring now to FIG. 1, a schematic of an example of a computing infrastructure is shown. Computing infrastructure 10 is only one example of a suitable computing infrastructure and is not intended to suggest any limitation as to the scope of use or functionality of embodiments of the invention described herein. Regardless, computing infrastructure 10 is capable of being implemented and/or performing any of the functionality set forth hereinabove.

In computing infrastructure 10 there is a computer system (or server) 12, which is operational with numerous other general purpose or special purpose computing system environments or configurations. Examples of well-known computing systems, environments, and/or configurations that may be suitable for use with computer system 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system 12 may be described in the general context of computer system executable instructions, such as program modules, being executed by a computer system. Generally, program modules may include routines, programs, objects, components, logic, data structures, and so on that perform particular tasks or implement particular abstract data types. Computer system 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system 12 in computing infrastructure 10 is shown in the form of a general-purpose computing device. The components of computer system 12 may include, but are not limited to, one or more processors or processing units (e.g., CPU) 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 12 typically includes a variety of computer system readable media. Such media may be any available media that is accessible by computer system 12, and it includes both volatile and non-volatile media, removable and non-removable media.

System memory 28 can include computer system readable media in the form of volatile memory, such as random access memory (RAM) 30 and/or cache memory 32. Computer system 12 may further include other removable/non-removable, volatile/non-volatile computer system storage media. By way of example only, storage system 34 can be provided for reading from and writing to a nonremovable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system 12 may also communicate with one or more external devices 14 such as a keyboard, a pointing device, a display 24, etc.; one or more devices that enable a user to interact with computer system 12; and/or any devices (e.g., network card, modem, etc.) that enable computer system 12 to communicate with one or more other computing devices. Such communication can occur via Input/Output (I/O) interfaces 22. Still yet, computer system 12 can communicate with one or more networks such as a local area network (LAN), a general wide area network (WAN), and/or a public network (e.g., the Internet) via network adapter 20. As depicted, network adapter 20 communicates with the other components of computer system 12 via bus 18. It should be understood that although not shown, other hardware and/or software components could be used in conjunction with computer system 12. Examples, include, but are not limited to: microcode, device drivers, redundant processing units, external disk drive arrays, RAID systems, tape drives, and data archival storage systems, etc.

Figure 2:
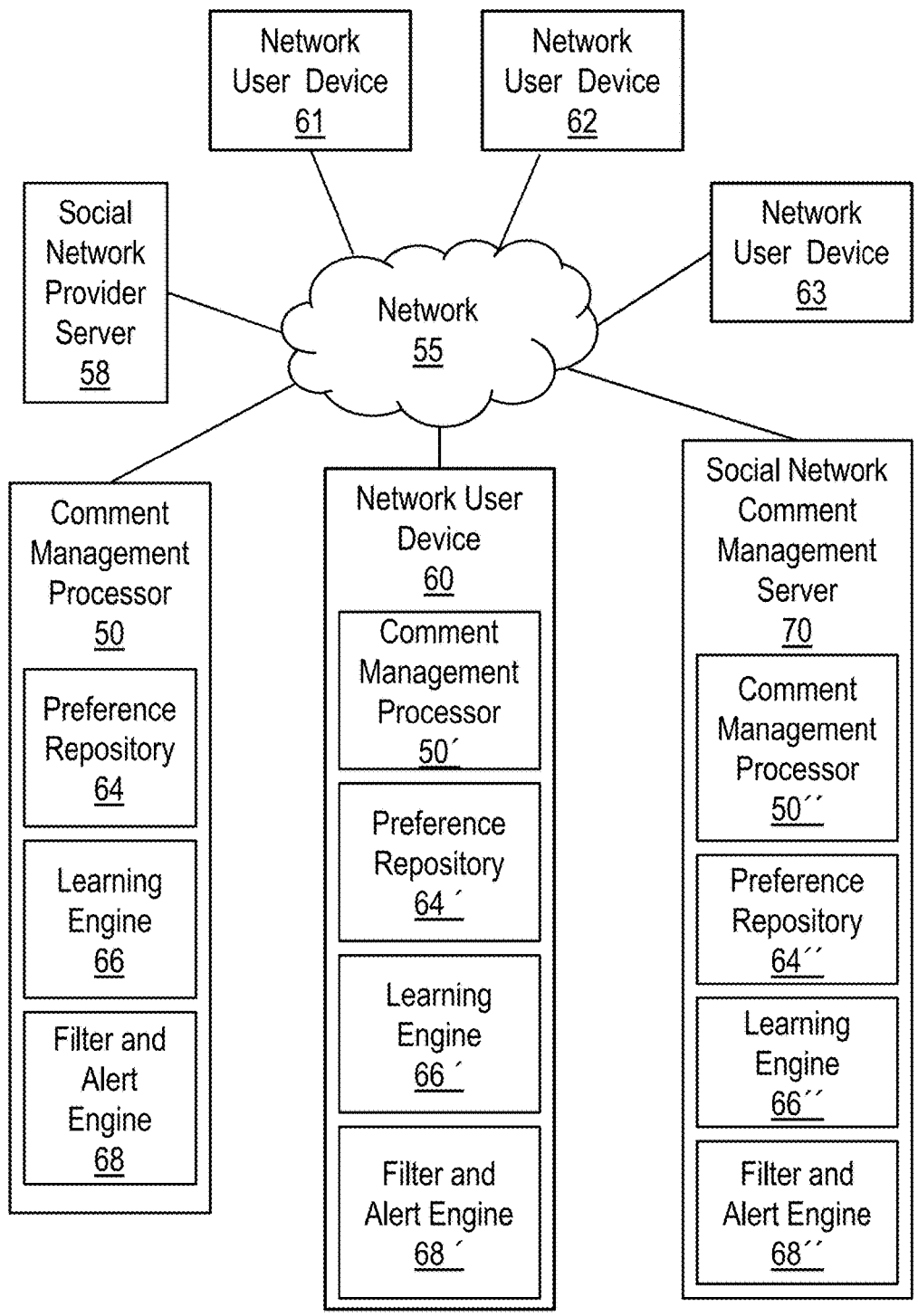
FIG. 2 shows an exemplary environment in accordance with aspects of the invention.

FIG. 2 shows an exemplary environment in accordance with aspects of the invention. The environment includes a comment management processor 50 connected to a network 55. The comment management processor 50 may include components of the computer system 12 of FIG. 1, and may be connected to the network 55 via the network adapter 20 of FIG. 1. The comment management processor 50 may be configured as a special purpose computing device that is in communication with a social network provider server 58 via network 55. The term social network provider as used herein includes providers of social media networks, business networks, blogs, reviews and ratings sites, discussion boards and forums, news feeds and other interactive online communities providing a forum for users to post content in a content post and interact with one another through the posting of content. The term "content post" as used herein should be understood to include comments, words, phrases, emojis, or other types content that are published on a social networking site by a user (e.g., comments section of a post).

The social network provider server 58 may be a server of a social network provider (e.g., social media network provider) in communication with a plurality of network user devices 60-63 via network 55. The comment management processor 50 may be part of a server managed by a third party provider and configured to provide a social network provider (e.g., operator of social network provider server 58) or social network users with comment management services. Comment management processor 50 may include a preference repository 64 for storing user profile information, a learning engine 66 for learning and updating user preferences, and a filter and alert engine 68 for providing filtered social network content and alerts to the network user devices 60-63.

The comment management processor 50, preference repository 64, learning engine 66, and filter and alert engine 68 may be incorporated into a user device. In embodiments, a comment management processor 50' is a processor on network user device 60 including a preference repository 64', a learning engine 66', and a filter and alert engine 68'. For example, the learning engine 66' and the filter and alert engine 68' could be provided as a plug in application or aggregate application for the network user device 60.

Additionally, in embodiments, a comment management processor 50" is a processor on a social network comment management server 70 including a preference repository 64", a preference repository 64", a learning engine 66", and a filter and alert engine 68". Social network comment management server 70 may be configured as a special purpose computing device that is part of a social network provider system (e.g., social media network provider). The social network comment management server 70 may include components of the computer system 12 of FIG. 1, and may be connected to the network 55 via the network adapter 20 of FIG. 1.

Based on the above, it can be understood that a comment management processor of the present invention may be operated by the social network it is intended to manage (e.g., social network comment management server 70), may be operated by a third party that provides comment management services to the social network (e.g., comment management processor 50), or may be incorporated into a user's computing device (e.g., network user device 60). Descriptions and characteristics of the comment management processor 50, the preference repository 64, the learning engine 66, and the filter and alert engine 68 should be understood to apply to corresponding elements (i.e., 50', 64', 66', 68', 50", 64", 66" and 68") in the network user device 60 and the social network comment management server 70. Thus, for the sake of brevity, aspects of the present invention will be described with reference to the comment management processor 50, the preference repository 64, the learning engine 66 and the filter and alert engine 68 only.

The network 55 may be any suitable communication network or combination of networks, such as a local area network (LAN), a general wide area network (WAN), and/or a public network (e.g., the Internet). The network user devices 60-63 may be general purpose computing devices, such as a desktop computer, laptop computer, tablet computer, smartphone, wearable technology, etc. In embodiments, the network user devices 60-63 each run a social network application that provides a customized user interface (e.g., a web page) by which a user may view and post content to a social network (via social network provider server 58).

Still referring to FIG. 2, the learning engine 66 is configured to perform one or more of the functions described herein. The learning engine 66 may include one or more program modules (e.g., program module 42 of FIG. 1) executed by the processor 50. In embodiments, the learning engine 66 is configured to monitor users' interactions with a social network and determine stylistic preferences of the users. The stylistic preferences of a user determined by the learning engine 66 are added to a profile list of the user in the preference repository 64. Stylistic preferences may include, but are not limited to: preferences regarding negative sentiments (e.g., anger, sadness, rudeness); general aversions to subject matter (e.g., a dislike of spiders or snakes); preferences regarding certain words (e.g., a dislike of rude words); or preference regarding categories of subject matter (e.g., an interest in politics).

Still referring to FIG. 2, the filter and alert engine 68 is configured to perform one or more of the functions described herein. The filter and alert engine may include one or more program modules (e.g., program module 42 of FIG. 1) executed by the processor 50. In embodiments, the filter and alert engine 68 dynamically filters out undesirable content associated with a social network post (content post) based on a user's profile list in the preference repository 64. In embodiments, the filter and alert engine 68 dynamically filters out undesirable content associated with a social network post for multiple users, based on one or more of the user's respective profile lists.

Figure 3:
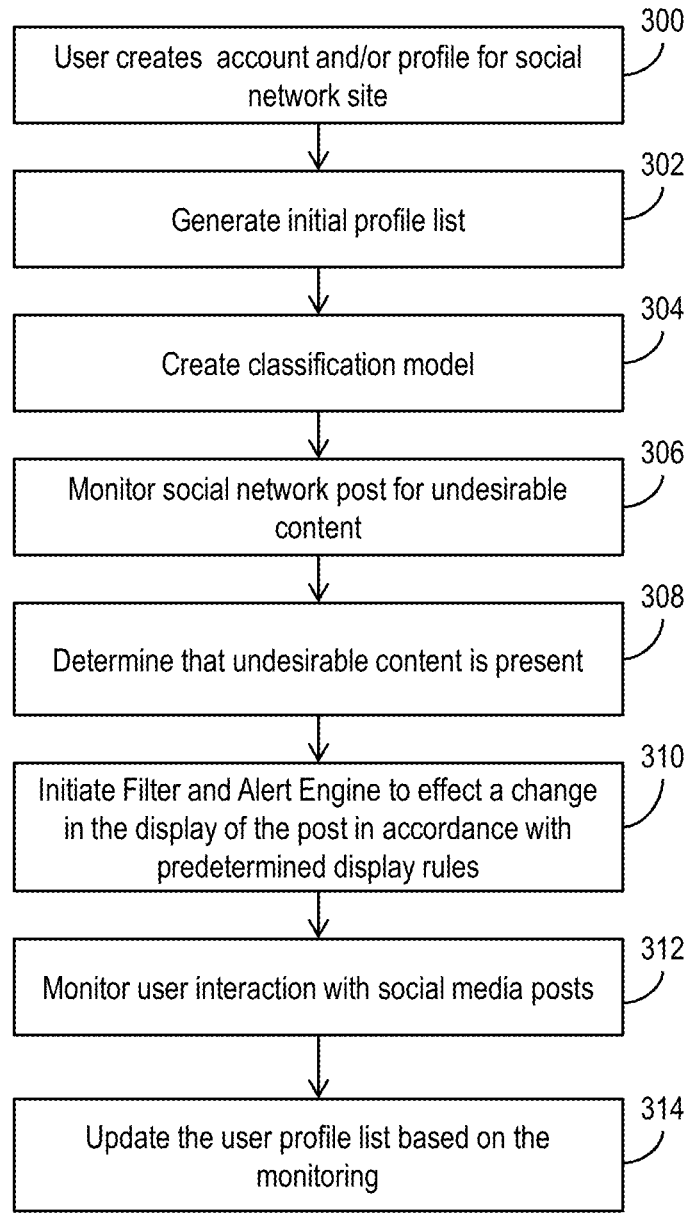
FIG. 3 shows a flowchart of steps of a method in accordance with aspects of the invention.

FIG. 3 shows a flowchart of a method in accordance with aspects of the invention. Steps of the method of FIG. 3 may be performed in the environment illustrated in FIG. 2, and are described with reference to elements shown in FIG. 2.

At step 300, a user creates an account and/or profile for a social network site (e.g., social media network site provided by social network provider server 58). In one social network example, each user of the social network is provided with a customized account interface (e.g., customized view on one or more user account pages). One example of such a network is FACEBOOK® (FACEBOOK is a registered trademark of Facebook, Inc.). One of ordinary skill in the art would understand that such networks enable a user to view their account, including customized posted content or content posts, after logging into the account using a password or the like. While each user of the social network site may share content (including content posts), the manner in which the content is displayed may vary (i.e., is customized) for each user of the social network site.

At step 302 the comment management processor 50 generates an initial user profile list, including a list of undesirable content and other content preferences. In aspects, the learning engine 66 of the comment management processor 50 implements step 302. The initial profile list may be based on a general set of initial assumptions stored in the preference repository 64, input provided directly by a user (such as through the profile created at step 300), historic social network activity of the user, or a combination thereof. By way of example, a user may be provided with a questionnaire which enables the user to select words, phrases, or ideas that are undesirable to the user (i.e., that the user finds undesirable or does not wish to encounter or be associated with while participating in a social network). Undesirable content may be in the form of words, phrases, emojis, etc. The questionnaire may then be utilized by the comment management processor 50 to generate the initial profile list for the user. By way of another example, the comment management processor 50 may include a database of one or more initial profile lists, each including words, phrases, or ideas that are typically found to be objectionable or undesirable by a group or category of users. In another example, the comment management processor 50 will search previous historic actions taken by the user with respect to historic social network postings (historic posts), and will generate an initial profile list according to the user's historic actions using known data mining techniques. This may include identifying historic posts that have been "hidden", deleted, or otherwise treated as including content the user does not wish to see. Once such historic posts are identified, the content of the historic posts can be analyzed to determine any common themes (e.g., words, phrases or ideas that appear to be undesirable to the user based on their actions), and these common themes can be utilized to predict possible undesirable content (e.g., content having the same or similar themes as the "hidden" or deleted historic posts are likely to be undesirable).

In embodiments, at step 304, the comment management processor 50 utilizes "language style" to generate a classification model to predict the likelihood of a comment being relevant to a user's preferences. More specifically, the processor 50 uses the initial user profile list of step 302 to create a training set utilizing the following sub steps. Initially, the processor 50 reviews posting comments (content posts) to identify undesirable content based on the profile list. Comments that contain undesirable content are treated as "positive objects" while other comments are treated as "negative objects". The training sets may be reviewed by humans to avoid errors due to ambiguities in language usage. For example, the term "terrific!" may be used in a sarcastic sense in a comment versus "terrific!" used in a positive complimentary sense, and a human reviewing the training set could spot this difference in usage and modify the training set accordingly.

In a first example, where an initial profile list identifies name calling as an undesirable content category, the processor 50 may determine that comments associated with a post include name calling and are therefore "positive objects". Likewise, the processor 50 may determine that other comments do not include name calling or other undesirable content and are therefore "negative objects".

In embodiments, processor 50 uses a Linguistic Inquiry Word Count (LIWC) dictionary to learn stylistic characteristics of positive objects and negative objects to help predict which post-associated content (e.g., comments) will be found undesirable (e.g., contain words, phrases, ideas, etc., that are objectionable to the user). For example, the following table illustrates stylistic category scores for exemplary negative and positive objects utilizing an LIWC.

TABLE 1

Stylistic Category Scores for Negative and Positive Object Sets

|  | you | poemo | negemo | anx | anger | sad | cogmech |
|---|---|---|---|---|---|---|---|
| POSITIVE OBJECT SET | 3.7 | 0 | 11.11 | 0 | 7.41 | 0 | 18.52 |
| NEGATIVE OBJECT SET | 0 | 8.33 | 0 | 0 | 0 | 0 | 20.83 |

In embodiments, the processor 50 uses the categories and scores (weights) shown above to identify discriminative features and learn a binary classification model. The learned model can be stored by the processor 50 and utilized by the learning engine 66 to predict whether a new comment contains undesirable content. Application of the classification model to new comments can be accomplished in step 306 below using a number of known methods, such as Support Vector Machines (SVM), and logistic regression, etc. It should be understood that a variety of known modeling techniques could be utilized in conjunction with user preference data in a user profile list to monitor for undesirable content (e.g., undesirable comments). The use of the classification model described above is not intended to be limiting.

At step 306, the processor 50 monitors social network posts (content posts) on a user's account for undesirable content. In aspects, the learning engine 66 of processor 50 performs the monitoring step 304. In embodiments, the processor 50 utilizes the classification model created at step 304 to determine whether comments are likely to be undesirable to a user.

At step 308, the processor 50 determines that undesirable content is likely present in a post (hereafter referred to as a "post of interest"). In aspects, the learning engine 66 performs the determination at step 308. For example, processor 50 may determine that a comment on a content post of interest likely contains undesirable content, resulting in the identification of a "suspect comment".

At step 310, the processor 50 initiates the filter and alert engine 68. In aspects, the learning engine 66 initiates the filter and alert engine 68 at step 310. Once initiated the filter and alert engine 68 effects a change in the display of the content post of interest on a user's account in accordance with predetermined display rules. The display rules may be rules selected by a user, preset system rules, or a combination thereof. By way of example, processor 50 may enable user selection of display rules, such as through a social network user interface. Display rules may include: a rule to automatically hide a suspect comment from a user while leaving the remainder of the content post of interest visible to the user; a rule to minimize a suspect comment while leaving the remainder of the content post of interest visible to the user; or a rule to flag a suspect comment or its associated content post of interest to indicate that the content post and/or comment likely contains undesirable content. It should be understood that various flagging and filtering methods may be utilized by the filter and alert engine. For example, color coded flags or text-based flags may impart information to a user regarding the nature of the suspect comment. In embodiments, a user can manually override the filtering. For example, a user may select an option on a display of the user's account to remove or override the filter (e.g., remove the flag).

In embodiments, at step 312 the processor 50 monitors user interactions with the content post of interest. For example, the processor 50 may determine if the user has commented on the content post of interest or its suspect comment, "liked" or otherwise indicated an interest in the content post of interest or its suspect comment, or deleted or otherwise indicated a lack of interest in the content post of interest or its suspect comment. This step may be performed by the learning engine 66. In aspects, the user's interaction with the content post of interest or a suspect comment thereon may override the filtering rule applied at step 308. For example, if a user chooses to remove a flag indicating that a suspect comment contains undesirable content, the learning engine 66 will recognize this interaction, and will reverse the filtering and or flagging applied at step 308. In the case where the suspect comment was hidden on a second user's account based on a filtering step applied at the first user's account, the learning engine 66 may unhide the suspect comment, such that the second user's account will show the suspect comment and the second user will be able to see the suspect comment after the first user has removed or reversed the filtering applied at step 308.

At step 314, user interactions with the content post of interest may be utilized to update preference repository 64. For example, the learning engine 66 may determine that a user has interacted with a suspect comment in a manner that indicates that the user does not actually view the content of the comment as being undesirable or objectionable, and may modify the user's profile list in preference repository 64 accordingly.

It should be understood that steps 300-314 described above can be conducted simultaneously for multiple users of a social network. Advantageously, aspects of the present invention enable the system to understand the preferences of one or more users by their interaction with social network content and social network engagement.

In embodiments, the social network comment management server 70 may utilize the user preference information from the preference repository 64 to filter any "suggested content" sent to the user (e.g., content presented to a user by the social network as content that the user may be interested in). By way of example, if a user always clicks "like" for all flowers that appear on the user's account interface except for red carnations, then red carnations may be hidden from the user's content feed via the filtering mechanism described above, and the social network may choose not to suggest any images of red carnations to the user as "suggested content" or content that the user may like.

Figure 4:
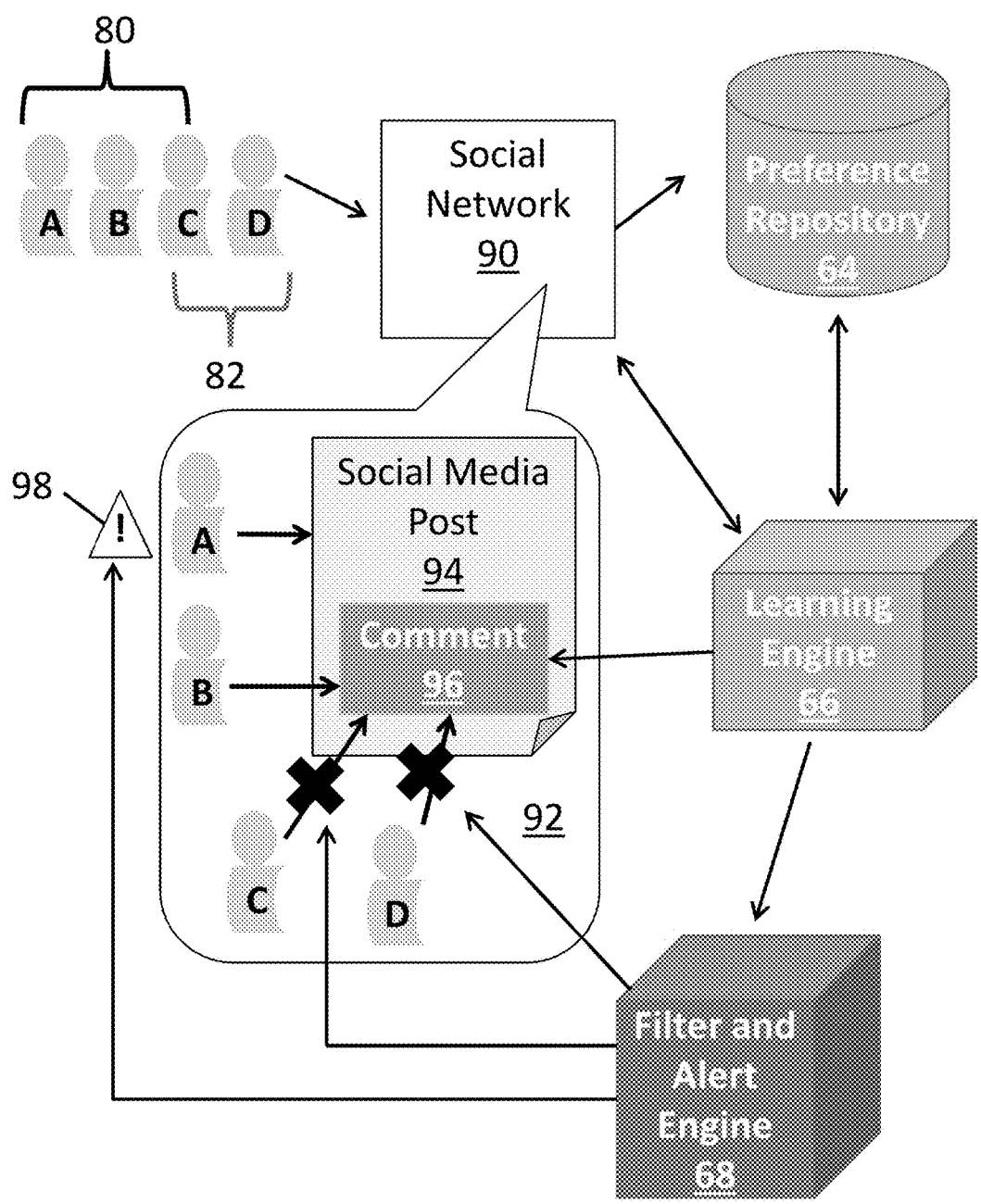
FIG. 4 shows a dynamic content filtering scenario in accordance with aspects of the invention.

FIG. 4 illustrates an exemplary dynamic comment filtering scenario in accordance with aspects of the invention. The interactions of FIG. 4 may be performed in the environment illustrated in FIG. 2, and are described with reference to elements shown in FIG. 2. Furthermore, methods illustrated in FIG. 4 may be performed in accordance with the steps of FIG. 3. In the scenario of FIG. 4, Users A-D can be understood as the users of respective network user devices 60-63 of FIG. 2, and social network 90 can be understood as being supported by social network provider server 58 of FIG. 2.

FIG. 4 depicts Users A, B, C and D of the social network 90. Social network interfaces for Users A, B, C and D are represented at 92. In embodiments, software applications on network user devices 60-63 will enable Users A, B, C and D to each view a customized social network interface on their respective network user device 60-63. In a first example, User A is connected with User B and User C, but is not connected to User D. User C is connected to User C, but is not connected to User's A and B. These relationships (connections) are indicated by brackets 80 and 82 in FIG. 4. In the context of this example, the phrase "connected with" can be understood to mean that the users are "friends" with one another, the users are "contacts" of one another, or the users are otherwise within one another's personal network within the larger social network of the social network 90. In this illustrated scenario, the social network 90 is of the type to display originating content posted on a first user's account with other users connected with the first user. Thus, original content posted on User A's account would be visible to Users B and C, but not D, unless User C comments, "likes" or otherwise indicates an interest in the content posted on User A's account.

Initially, Users A-D each create user profiles with their content preferences in accordance with step 300 of FIG. 3. This step can occur during registration, wherein Users A-D registering with social network 90 can indicate content preferences and display preferences (e.g., always hide rude comments). The user profiles may be saved in preference repository 64 and utilized by the preference repository 64 to generate initial profile lists in accordance with step 302 of FIG. 3. The learning engine 66 utilizes the data from the preference repository 64 to monitor content posts on the social network 90 for each user account (each account of Users A-D) in accordance with step 306 of FIG. 3, to determine whether any of the content posts contain undesirable content.

In the scenario depicted, User A makes (publishes) an original content post 94 (e.g., a social media post) on the social network 90. User B then makes a rude comment 96 on the content post 94. The learning engine 66 determines that User B's comment is not preferred by User C (i.e., is undesirable content), and is also not preferred by User A, in accordance with step 308 of FIG. 3. The learning engine 66 initiates the filter and alert engine 68 in accordance with step 310 of FIG. 3. In the present scenario, User A's display rules indicate that undesirable comments should be flagged by the system, and User C's display rules indicate that undesirable comments should be hidden from view. Accordingly, the filter and alert engine 68 proceeds to hide User B's comment 96 from User C, and displays a flag 98 to alert User A that User B's comment is rude. Since User D is within User C's personal network, and not within User B's personal network, User C's display rule results in the rude comment being hidden from User D's view. Thus, it can be understood that User C need not be concerned that User D will associate User C with the rude content in comment 96.

The learning engine 66 continues to monitor content posts, including the content post 94, for any interactions with Users A-D, to further determine their stylistic preferences and language styles in accordance with step 312 of FIG. 3. By way of example, if User A "likes" the comment 96, the learning engine 66 will recognize that User A does not find the comment objectionable, and the learning engine 66 may update User A's preference data in preference repository 64 accordingly (see step 314 of FIG. 3). In embodiments, the system will enable a user to "unflag" content original classified by the learning engine 66 as undesirable content, or otherwise update filters applied by the filter and alert engine 68. By way of example, User A may right click on the flag 98 issued by the filter and alert engine 68 to select a "delete" option.

In another scenario illustrated by FIG. 4, User A "likes" the content post 94 of User B or otherwise indicates an interest in the content post 94. Other users in User A's personal network can now see that User A "likes" the content post. The learning engine 66 recognizes that User A has shown an interest in the content post 94 and monitors the content post 94 for undesirable content in accordance with step 306 of FIG. 3. If the learning engine 66 recognizes that User B has subsequently posted undesirable content in a comment 96 to the content post 94, the learning engine 66 would initiate the filter and alert engine 68 to hide the comment 96 from other user's in User A's personal network (User C), so that others in User A's personal network will not associate the negative comment 96 with the User A.

In embodiments, a service provider, such as a Solution Integrator, could offer to perform the processes described herein. In this case, the service provider can create, maintain, deploy, and support, etc., the computer infrastructure that performs the process steps of the invention for one or more customers. These customers may be, for example, providers of social networks, such as social media networking sites. In return, the service provider can receive payment from the customer(s) under a subscription and/or fee agreement and/or the service provider can receive payment from the sale of advertising content to one or more third parties.

In still another embodiment, the invention provides a computer-implemented method for dynamic filtering of content posted to a social network. In this case, a computer infrastructure, such as computer system 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system 12 (as shown in FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
generating, by a computing device, a user profile list for a user of a social network, the user profile list including data regarding preferences of the user with respect to undesirable content;
monitoring, by the computing device, a content post on the social network to determine if the content post includes the undesirable content, the content post being displayed to the user through a social network interface;
determining, by the computing device, that a comment in the content post includes the undesirable content;
effecting, by the computing device, a change in the display of the content post in accordance with one or more predetermined display rules based on the determining that comment in the content post includes the undesirable content; and
hiding, by the computing device, the comment of the content post from viewing by another user based on the one or more predetermined display rules when the other user is within the personal network of the user, but is not within the personal network of an author of the comment, and is not otherwise associated with the content post;
determining, by a learning engine of the computing device, an interaction of the user with the content post; and
dynamically updating, by the learning engine of the computing device, the user profile list based on the interaction of the user with the content post.

2. The method of claim 1, further comprising:
monitoring, by the computing device, the content post for the interaction of the user with the content post.

3. The method of claim 1, further comprising creating a classification model based on the user profile list, wherein the classification model is utilized in the monitoring the content post.

4. The method of claim 1, wherein:
the monitoring the content post comprises monitoring comments associated with the content post; and
the determining that the content post includes the undesirable content comprises determining that a comment associated with the content post includes the undesirable content and is a suspect comment.

5. The method of claim 4, wherein:
the one or more predetermined display rules includes a rule to hide suspect comments; and
the effecting the change in the display of the content post comprises hiding the suspect comment.

6. The method of claim 4, wherein:
the one or more predetermined display rules includes a rule to flag suspect comments; and
the effecting the change in the display of the content post comprises flagging the suspect comment.

7. A computer program product for dynamic filtering of content posted to a social network, the computer program product comprising a computer readable storage medium having program instructions embodied therewith, the program instructions executable by a computing device to cause the computing device to:
generate a first user profile list for a first user account of the social network, the first user profile list including a first listing of undesirable content;
generate a second user profile list for a second user account of the social network, the second user profile list including a second listing of undesirable content;
monitor one or more comments associated with a content post on the first social network account to determine if the one or more comments include undesirable content from the first user profile list, wherein the content post is displayed on a first user device to the first user through the first user account and is displayed on a second user device to the second user through the second user account;
determine that one of the one or more comments includes undesirable content from the first user profile list and is a suspect comment;
prevent the suspect comment from displaying on the second user account based on the determining that the one of the one or more comments includes undesirable content from the first user profile when the second user account is within the personal network of the first user account and is not otherwise associated with the suspect comment;
determine, by a learning engine of the computing device, an interaction of the first user with the content post; and
dynamically update, by the learning engine, the first user profile list based on the interaction of the first user with the content post.

8. The computer program product of claim 7, wherein the program instructions further cause the computing device to determine that the one or more comments include undesirable content from the second user profile list.

9. The computer program product of claim 7, wherein the program instructions further cause the computing device to effect a change in the display of the content post in the first user account to indicate to a first user that the content post contains the suspect comment.

10. The computer program product of claim 9, wherein the effecting the change in the display of the content post comprises flagging the suspect comment without hiding the content post from the first user.

11. The computer program product of claim 9, wherein effecting the change in the display of the content post comprises hiding the suspect comment without hiding the content post from the first user.

12. The computer program product of claim 7, wherein the program instructions further cause the computing device to monitor the content post for interactions of a first user with the content post.

13. The computer program product of claim 7, wherein the program instructions further cause the computing device to creating a classification model based on the first user profile list, wherein the classification model is utilized in the monitoring the one or more comments associated with the content post.

14. A system for dynamic filtering of content posted to a social network, comprising:
- a CPU, a computer readable memory and a computer readable storage medium associated with a computing device;
- program instructions to generate, by a learning engine, a user profile list for a user of a social network, the user profile list including data regarding preferences of the user with respect to undesirable content;
- program instructions to monitor, by the learning engine, a content post on the social network to determine if the content post includes the undesirable content, the content post being displayed to the user through a social network interface;
- program instructions to determine, by the learning engine, that the content post includes the undesirable content indicated in the user profile list;
- program instructions to effect a change in the display of the content post, by a filter and alert engine, in accordance with one or more predetermined display rules of the user;
- program instructions to monitor, by the learning engine, the content post for interactions of the user with the content post;
- program instructions to dynamically update, by the learning engine, the user profile list based on an interaction of the user with the content post; and
- program instructions to effect a change in a display of the content post to another user in accordance with the one or more predetermined display rules of the user.

15. The system of claim 14, wherein:
the program instructions to monitor the content post comprises instructions to monitor comments associated with the content post; and
the program instructions to determine that the content post includes the undesirable content comprises instructions to determine that a comment associated with the content post includes the undesirable content and is a suspect comment.

16. The system of claim 15, wherein:
the one or more display rules includes a rule to hide suspect comments; and
the effecting the change in the display of the content post comprises hiding the suspect comment.

17. The system of claim 15, wherein:
the one or more display rules includes a rule to flag suspect comments; and
the effecting the change in the display of the content post comprises flagging the suspect comment.

* * * * *